United States Patent
Hayashida

[11] 3,918,765
[45] Nov. 11, 1975

[54] PRESSURE CONTROL VALVE FOR VEHICLE BRAKING SYSTEM

[75] Inventor: Yoshihiro Hayashida, Chigasaki, Japan

[73] Assignee: Tokico Ltd., Kanagawa, Japan

[22] Filed: Apr. 17, 1974

[21] Appl. No.: 461,591

[30] Foreign Application Priority Data
Apr. 17, 1973 Japan.............................. 48-43361

[52] U.S. Cl................ 303/6 R; 60/582; 188/152; 303/52
[51] Int. Cl.²......................................... B60T 13/00
[58] Field of Search............ 303/6 C, 6 R, 10, 21 F, 303/52, 50; 188/345, 152, 181 A; 60/561–562, 581–582

[56] References Cited
UNITED STATES PATENTS

| | | | |
|---|---|---|---|
| 3,526,440 | 9/1970 | Blair | 303/52 X |
| 3,640,067 | 2/1972 | Ingram | 188/345 X |
| 3,702,207 | 11/1972 | Armstrong | 303/6 C X |
| 3,729,235 | 4/1973 | Bach et al. | 303/21 F |
| 3,830,549 | 8/1974 | Kito et al. | 303/6 R |

*Primary Examiner*—Trygve M. Blix
*Assistant Examiner*—Douglas C. Butler
*Attorney, Agent, or Firm*—James E. Nilles

[57] ABSTRACT

A pressure control valve for use in a dual braking system of a vehicle comprising a pedal-actuated piston for transmitting hydraulic pressure to the large ends of two separate stepped pistons, wherein the small end of each of the stepped pistons cooperating with respective valve members for connecting a wheel cylinder selectively with a hydraulic reservoir and with a pressure source, and wherein an annular shoulder at the step of the stepped piston of one system is exposed to hydraulic pressure of the wheel cylinder of the other system which acts opposite to that of the pedalactuated piston.

3 Claims, 1 Drawing Figure

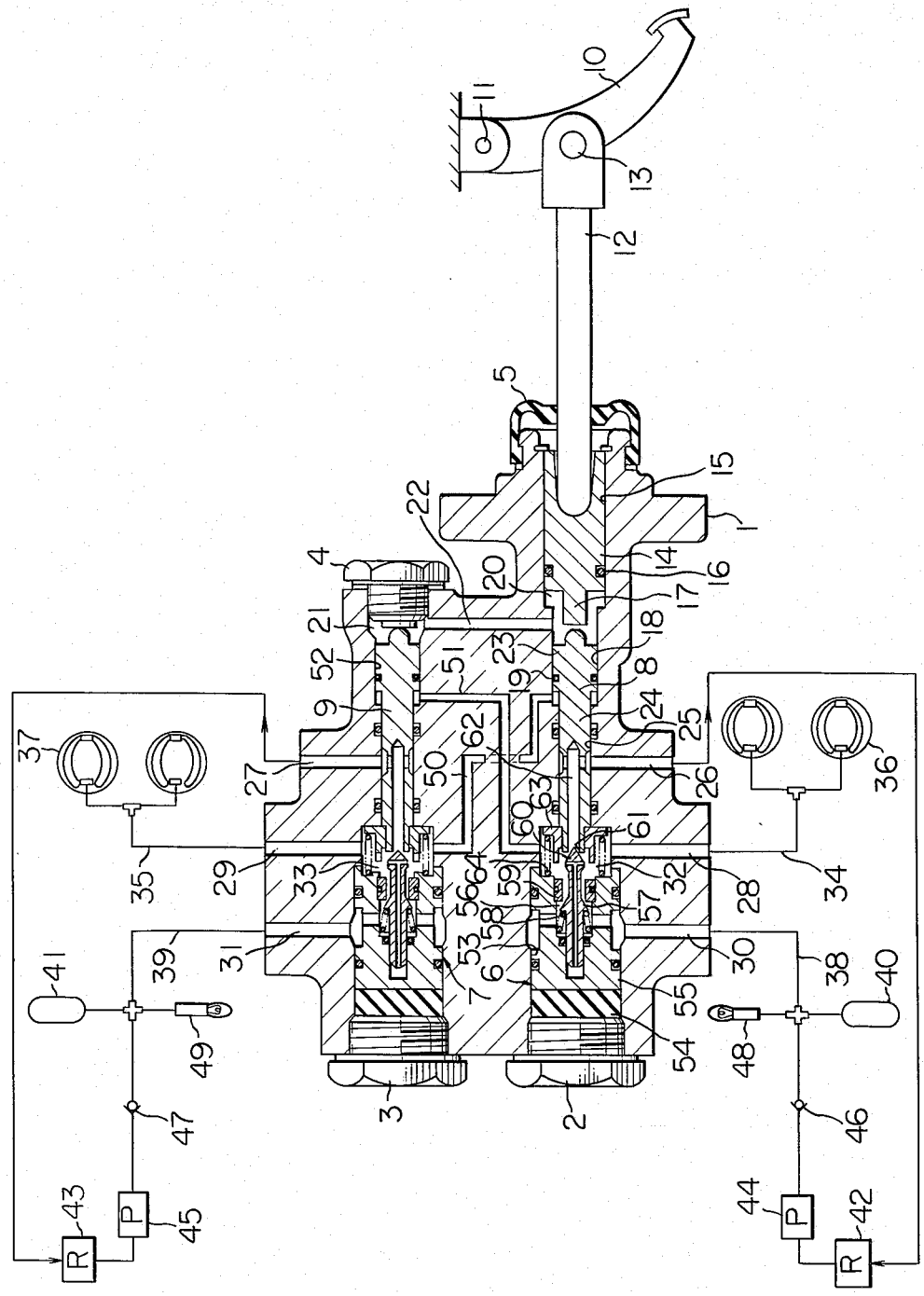

3,918,765

PRESSURE CONTROL VALVE FOR VEHICLE BRAKING SYSTEM

BACKGROUND OF THE INVENTION

This invention relates to a pressure control valve for use in a vehicle braking system, and particularly for use in a dual system hydraulic braking equipment of an automobile.

To avoid a risk of failure such as oil leakage, a dual system hydraulic braking equipment is usually provided, in which, two pairs of wheels such as a pair of front and rear wheels and a pair of front and rear wheels, or a pair of front wheels and a pair of rear wheels are controlled independently by two separate braking systems. Most of the braking equipment of the type described includes two control valves arranged in parallel relation to each other and adapted to be actuated simultaneously when a brake pedal is depressed.

In the braking equipment of the type described, in the event that a failure such as oil leakage occurs in one of the braking systems, the other system remains operative for stopping the vehicle. However, a failure arising in one system results in increasing the distance required for stopping the vehicle as compared with the condition where two systems are operative. In other words, for stopping the vehicle at the same braking distance, a large braking force needs to be applied to one braking system when the other system has failed, and this necessitates increasing the force applied to the brake pedal.

DETAILED DESCRIPTION OF INVENTION

It is accordingly an object of the present invention to provide a pressure control valve for use in a dual system hydraulic braking equipment of a vehicle wherein in the event of a failure in one of the systems, hydraulic pressure in the other system increases automatically without increasing the force applied to the brake pedal.

According to the present invention, a pressure control valve of the type described comprises a valve body having two separate bores therein, a pair of stepped pistons being slidably received in the complementary stepped bore portions of said bores, a pressure space defined in each of said bores being communicated permanently with at least one of the wheel cylinders of the vehicle, valve means for selectively connecting said pressure space with a source of hydraulic fluid under pressure and a reservoir being disposed coaxially with respect to said piston and adapted to be actuated by the inner end of said piston, said inner end being of smaller diameter and exposed to said pressure space, a pedal-actuated piston being disposed coaxially with one of said pistons for transmitting hydraulic pressure to the larger ends of said pistons commonly, and a pair of oil passages connecting each of said pressure spaces with an annular space defined by an annular shoulder at the step of the piston and the corresponding annular shoulder of the stepped bore portion respectively so that braking pressure of one system acts opposite to the movement of the stepped piston actuating the other system.

Thus, in the event of a failure in one of the systems, an increased braking pressure can be produced in the other system.

BRIEF DESCRIPTION OF DRAWING

An embodiment of this invention is illustrated in the accompanying drawing in which:

The single FIGURE of the accompanying drawing shows a longitudinal section of a hydraulic control valve of this invention and diagramatically illustrated braking systems.

DETAILED DESCRIPTION OF PREFERRED EMBODIMENT

In the accompanying drawing, a valve body 1 of this invention includes two parallel axial through bores, the opposite ends of one of the bores being closed with plugs 3 and 4, and one end of the other bore is closed by a plug 2, the end portion of the bore opposite to the plug 2 receiving therein a push rod 12 which connects a brake pedal 10 to a pedal actuated piston 14. There is provided a dust seal cap 5 as shown. In respective bores there are provided valve units 6 and 7 and stepped pistons 8 and 9 respectively which will be described later.

The brake pedal 10 is supported by a shaft 11 serving as a fulcrum. One end of the push rod 12 is pivotally connected at 13 to the brake pedal 10 and the other end thereof extends through the cap 5 and the tip end of which engages with a recess formed in the outer end of the piston 14.

The piston 14 is fitted slidably in a cylinder bore 15 and sealed by a seal 16. The piston 14 has a protruding end 17. Cylinder bores 18 and 25 are provided inwardly of the cylinder bore 15 coaxially. The diameter of the bore 18 is smaller than that of the bore 15 but larger than that of the bore 25. The stepped piston 8 has a large diameter portion 23 and a reduced diameter portion 24 corresponding respectively to the bores 18 and 25 is sealingly and slidably fitted therein. The stepped piston 9 is quite the same in construction as the piston 8 and disposed in the bore formed between the plugs 4 and 3.

An oil chamber 20 defined between the piston 14 and the large end of the piston 8 is communicated by way of a passage 21 with an oil chamber 22 defined between the plug 4 and the large end of the piston 9, thus, the passage 22 acts as a pressure equalizer which will be described later.

A passage 26 communicating with the small diameter bore portion 25 is connected by way of an external piping to a reservoir of hydraulic fluid 42. A passage 27 corresponding to the passage 26 is connected to a reservoir 43 of the other system. Further, passages 28, 29, 30 and 31 are also provided in the valve body 1. The passages 28 and 29 are communicated at their one ends with pressure spaces 32 and 33 respectively, and connected at their other ends through pipings 34 and 35 to wheel cylinders 36 and 37 of respective braking systems respectively. The passages 30 and 31 are communicated at their one ends with valve units 6 and 7 respectively, and are connected at their other ends through pipings 38 and 39 to hydraulic accumulators 40 and 41 respectively. The accumulators 40 and 41 are connected through check valves 46 and 47 to the outlets of hydraulic pumps 44 and 45, the inlets of which are connected to the reservoirs 42 and 43, respectively. Designated 48 and 49 are warning lamps, which are connected to the accumulators 40 and 41 respectively for indicating that the internal pressure in the accumulators 40 and 41 is lower than a predetermined level.

Furthermore, two passages 50 and 51 are provided in the valve body. The passage 50 connects the pressure space 33 with an annular space defined between an annular shoulder at the step in diameter change of the stepped piston 8 and an annular shoulder at the step in diameter between the bore portion 18 and the bore portion 25. The passage 51 connects the pressure space 32 with an annular space defined between an annular shoulder at the step of the stepped piston 9 and an annular shoulder of the bore portions corresponding thereto.

The valve units 6 and 7 will be described, but since the valve unit 7 is identical to the valve unit 6 the detailed description will be omitted. The valve unit 6 is received in a cylinder bore portion 53 which is provided coaxially with respective cylinder bore portions 15, 18 and 25 and with the pressure space 32. The bore portion 53 is larger in diameter than the bore portions 15, 18 and 25, and also than the pressure space 32.

A free piston or a movable valve seat member 55 is sealingly fitted in the bore portion 53 and urged toward the pressure space 32 by a resilient member 54. The resilient member 54 is made of rubber or a compression spring having a relatively high spring constant, and acts between the plug 2 and the piston 55. A chamber 56 is formed in the central portion of the piston 55, and is communicated with the passage 30. A supply valve 57 is disposed in the chamber 56 and urged against a valve seat 59 by means of a compression spring 58.

The supply valve 57 has one end which pierces through the valve seat 59 and extends into the pressure space 32, and which acts as a valve member 60 of a discharge valve. The valve member 60 cooperates with a valve seat 61 formed at the inner end of the small diameter portion 24 of the stepped piston 8. The valve member 60 is normally held apart from the valve seat 61.

The pressure space 32 receives a spring seat 63 which is fitted integrally on the inner end of the small diameter portion 24 of the stepped piston 8, and which is urged by a compression spring 64 in the rightward direction in the drawing for locating the stepped piston 8 to its home position.

When a driver of the vehicle depresses the brake pedal 10, the piston 14 moves leftward by the force transmitted from the brake pedal 10 through the push rod 12 causing hydraulic pressure in the oil chamber 20. The piston 8 moves leftward against the force of the spring 64, thus, the discharge valve seat 61 formed on the left end of the piston 8 engages with the valve member 60, thereby blocking the communication between the passages 26 and 28, whereby the communication between the wheel cylinders 36 and the reservoir 42 of hydraulic fluid is interrupted. A further leftward movement of the piston 8 retracts the supply valve 57 from the supply valve seat 59 against the force of the spring 58, whereby the passages 30 and 28 are communicated causing the hydraulic accumulator 48 to communicate with the wheel cylinders 36. Consequently, pressurized oil from the hydraulic pump 44 is supplied to the wheel cylinders 36 thereby effecting a braking action.

At the time when the piston 8 is moved leftward, the piston 9 is also moved leftward simultaneously, since the oil chamber 21 is connected to the oil chamber 20 by means of the passage 22. Thus, the valve unit 7 is actuated in like manner with the valve unit 6, and a braking action is effected in both systems simultaneously. A difference in stroke between the valve units 6 and 7 is compensated for by the passage 22 such that the wheel cylinders 36 and 37 in both systems may be operated equally.

When the brake pedal 10 is returned to its home position, the piston 8 and the supply valve 57 also move rightward to their home positions under the restoring force of the springs 58 and 64. The supply valve 57 engages with the valve seat 59 and the discharge valve 60 separates from the valve seat 61, whereby the communication between the hydraulic reservoir 40 and the pressure space 32 is interrupted, and the wheel cylinders 36 come to communicate with the reservoir 42, thus the braking action is released.

The passage 50 connecting the pressure space 33 with an annular oil chamber defined between an annular shoulder at the step in diameter of the stepped piston 8 and an annular shoulder at the step between the bore portion 18 and the bore portion 25, and the passage 51 communicates the pressure space 32 with an annular oil chamber in the bore portion 52 receiving the stepped piston 9, such that pressures in the pressure spaces 32 and 33, which have been raised to a high level by depressing the brake pedal 10, act on the pistons 8 and 9 to urge both pistons rightward against the force actuating the same leftwards. Normally, the pressures in the pressure spaces 32 and 33 are equal in level and thus any difference will not be observed between the function of the two valve units 6 and 7.

Now, referring to the case where a failure occurs in one of braking systems due to oil leakage or the like. For convenience of description, it is supposed that oil leakage occurs on the side of the valve unit 7. In such an event, the valve unit 6 continues to operate such that pressurized oil will be supplied to the wheel cylinders 36, and a braking action will be effected. At this time, the pressure space 32 will be maintained in braking pressure, while in the pressure space 33 no pressure will be introduced.

When both systems are in normal condition, the piston 8 receives an opposing force of a level of the sum of the cross-sectional area of small diameter portion 24 and that of the annular oil chamber (i.e., the cross-sectional area of a large diameter portion 23) multiplied by pressure in the pressure spaces (pressures in both spaces 32 and 33 are equal). In the event of a failure in one system, no pressure is introduced in the annular oil chamber in the bore portion 18, such that the piston 8 (acting for the other system) will receive an opposing force of a level of the product of the cross-sectional area of the small diameter portion 24 of the piston 8 and the pressure in the pressure space 32.

Thus if the force depressing the brake pedal 10 is maintained at the same level as in the normal condition, it necessarily results in an increase in the pressure in the presure space 32 for producing the opposing force of the same level. Stated otherwise, if the cross-sectional area of the annular oil chamber in the bore portion 18 is equal to that of the small diameter portion 24, then the pressure in the pressure space 32 will be increased twice as high as that in the normal condition. Thus, there will be provided a braking effect similar to that in the normal condition.

In this case, pressure in the pressure space 32 acts on the annular oil chamber in the bore portion 52 so as to afford an ample opposing force to the piston 9, such that any excessive movement of the piston 9 will be avoided.

As is apparent from the foregoing description, in the event of a failure in one system of the dual braking system, there can be applied to the other system a hydraulic pressure of a level twice as high as that in the normal condition by applying to the brake pedal the depressing force of a level the same as in the normal condition, and thus a reduced braking distance will be obtained.

The oil chamber 20 and 21 are communicated with each other by way of the passage 22 so as to actuate pistons 8 and 9 under hydraulic pressures in respective chambers 20 and 21, such that the arrangement acts as an equalizer providing an equal stroke to the valve units 6 and 7. It is advantageous that the arrangement is simple in construction and free from trouble.

The protruding end 17 of the pedal-actuated piston 14 is normally held apart from the stepped piston 8, but in the event of oil leakage in the oil chambers 20 and 21, the piston 14 can engage with the piston 8 thereby insuring a braking action for one of the braking systems.

A trouble in a braking system will be readily noted by the driver through warning lamps 48 and 49 as set forth in the embodiment.

I claim:

1. A pressure control valve for use in a dual circuit braking system for a vehicle comprising: a valve body having two stepped bores therein, a stepped piston slidably received in each of said stepped bores, an annular space defined between each of the stepped bores and stepped pistons received in said stepped bores, a pressure space defined respectively in each of said bores, each pressure space being communicated with at least one wheel cylinder of one of said braking circuits, valve means disposed in each of said pressure spaces for selectively connecting each of said pressure spaces with a source of hydraulic fluid under pressure and with a reservoir, a positively actuated piston disposed in one of said stepped bores coaxially with one of said stepped pistons and defining a fluid space with said stepped bore and said stepped piston, said positively actuated piston adapted to pressurize hydraulic fluid confined in said fluid space, said stepped pistons each having an end exposed in each of said pressure spaces and axially slidable therein for engaging said valve means and for actuating said valve means to connect one of the pressure spaces with the source of hydraulic fluid under pressure, and a passage permanently connecting one of the pressure spaces in one of said stepped bores to the annular space in the other stepped bore, to cause increased pressure in said one of the pressure spaces in response to decreased pressure in the other of said pressure spaces.

2. A pressure control valve as set forth in claim 1 wherein the diameter of said positively actuated piston is larger than the diameter of the stepped pistons.

3. A pressure control valve as set forth in claim 2 wherein one end of the positively actuated piston is formed to have a protruding end which is spaced from the stepped piston when in a normal operating condition.

* * * * *